United States Patent

Davis, Jr. et al.

[15] 3,644,825
[45] Feb. 22, 1972

[54] MAGNETIC DETECTION SYSTEM FOR DETECTING MOVEMENT OF AN OBJECT UTILIZING SIGNALS DERIVED FROM TWO ORTHOGONAL PICKUP COILS

[72] Inventors: Paul D. Davis, Jr., Garland; Thomas E. McCullough, Dallas, both of Tex.

[73] Assignee: Texas Instruments Incorporated, Dallas, Tex.

[22] Filed: Dec. 31, 1969

[21] Appl. No.: 889,574

[52] U.S. Cl. ................................ 324/41, 324/4, 324/8, 340/38, 340/258
[51] Int. Cl. .............................................. G01r 33/00
[58] Field of Search .............. 324/41, 43, 8, 3, 4; 340/38 L, 340/258 C, 195, 197; 33/204, 204.4, 204.43

[56] References Cited

UNITED STATES PATENTS

| | | | |
|---|---|---|---|
| 2,741,853 | 4/1956 | Anderson | 324/43 X |
| 2,749,506 | 6/1956 | Emerson | 340/197 X |
| 3,355,707 | 11/1967 | Koerner | 324/41 X |

Primary Examiner—Rudolph V. Rolinec
Assistant Examiner—R. J. Corcoran
Attorney—James O. Dixon, Andrew M. Hassell, Rene E. Grossman, Melvin Sharp and Richards, Harris and Hubbard

[57] ABSTRACT

A pair of magnetic field sensors are disposed perpendicular to one another for sensing, at a single location, different directional components of a magnetic field. The output signals from the magnetic field sensors are vectorally combined to provide vector representations of the varying magnetic field. The direction of movement of the vector representations is then determined in order to indicate either the direction of movement of the object creating the variations in the magnetic field or the relative position of the object with respect to the sensors.

15 Claims, 13 Drawing Figures

PATENTED FEB 22 1972 3,644,825

INVENTORS:
PAUL D. DAVIS, JR.
THOMAS E. McCULLOUGH

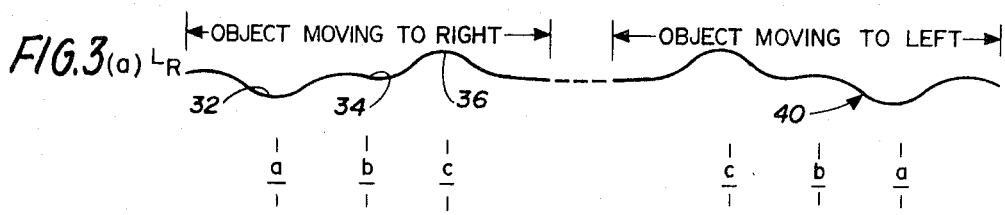
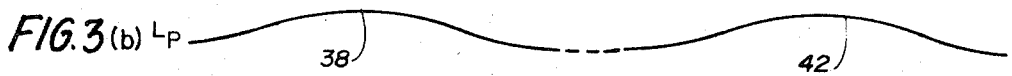
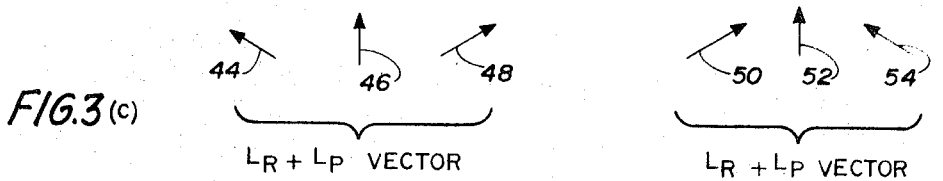
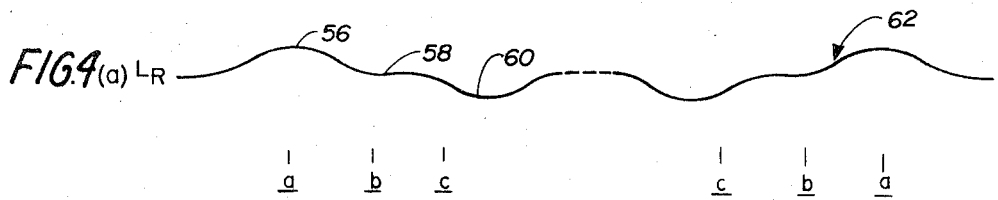
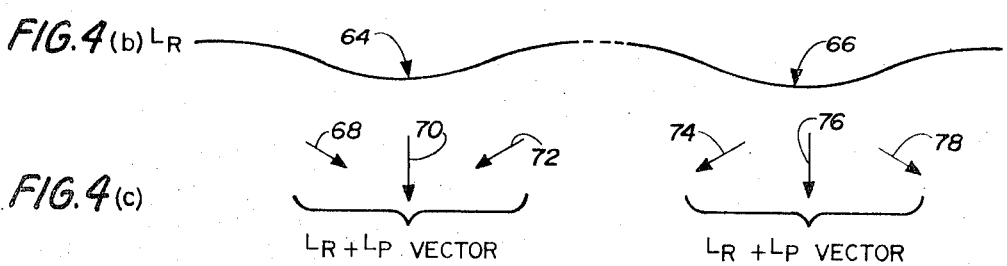
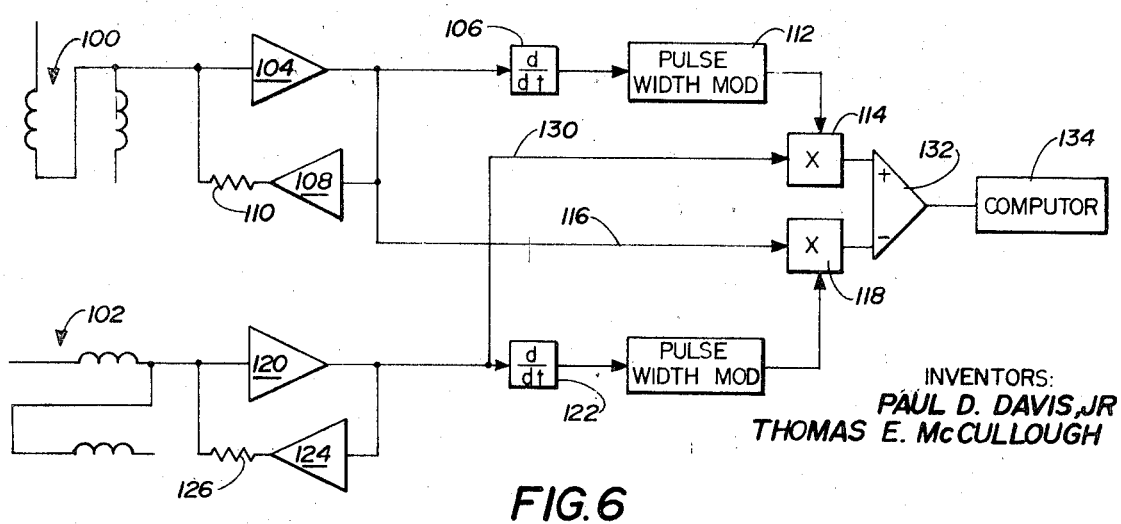
FIG.6
INVENTORS:
PAUL D. DAVIS, JR
THOMAS E. McCULLOUGH

MAGNETIC DETECTION SYSTEM FOR DETECTING MOVEMENT OF AN OBJECT UTILIZING SIGNALS DERIVED FROM TWO ORTHOGONAL PICKUP COILS

This invention relates to the sensing of magnetic fields, and more particularly to a method and system for determining the direction of movement or the relative position of an object having a magnetic moment.

It is desirable for a number of applications to be able to detect the presence and movement of metal or magnetic objects. For instance, it is often desirable to detect the number of vehicles passing a predetermined highway location and to indicate the direction of movement of the various vehicles. Also, there are many security environments wherein it is desirable to detect the presence of weapons and the like, such as the checking of passengers for weapons prior to boarding aircraft or other vehicles.

Several different types of magnetic-field-sensing techniques have heretofore been developed to provide such magnetic field detection. An example of a single loop detector for use in vehicle proximity detection is disclosed in the U.S. Pat. to Barringer et al. U.S. Pat. No. 3,430,221, issued Feb. 25, 1969. Another type of system utilizing a single sensor is disclosed in the patent to Koerner U.S. Pat. No. 3,355,707, issued Nov. 28, 1967. However, such systems have not been able to indicate the direction of travel of an object passing in proximity thereto, and have often required relatively complex circuitry involving threshold measurement. Other systems have thus heretofore been developed wherein two magnetic sensors, such as magnetometers, have been spaced apart along a roadway in order to determine the direction of an automobile's movement. However, such systems are undesirably expensive in that at least two sensors and associated circuitry are required.

In accordance with the present invention, a pair of magnetic field sensors have their sensing axes disposed at an angle to one another for generation of output signals representative of the changes in a magnetic field at a single location. Circuitry is connected to the sensors for vectorally combining the output signals into vector signals. Circuitry is provided for determining the direction of movement of the vector signal to indicate an aspect of the physical orientation of the object which causes the variations in the magnetic field.

In accordance with a more specific aspect of the invention, a plurality of magnetic field sensors each generate output signals representative of a different directional component of one location of a magnetic field. Circuitry is provided which is responsive to the output signals for generating time derivative signals. Circuitry combines the output signals with the time derivative signals to produce resultant signals representative of the direction, speed and magnetic moment of the object causing the varying magnetic field.

In accordance with yet another more specific aspect of the invention, two magnetic field sensors generate output signals representative of perpendicular directional components of a varying magnetic field. Each of the output signals is differentiated, and circuitry multiplies each output signal by the differential of the other output signal. One of the multiplication products is then subtracted from the other multiplication product to provide a resultant signal. The polarity and magnitude of the resultant signal is sensed to determine either the direction of movement of the object creating the magnetic field, or to indicate the relative position of the object with respect to the sensors if the direction of movement of the object is known.

For a more complete understanding of the present invention and for further objects and advantages thereof, reference may now be made to the following description taken in conjunction with the accompanying drawings, in which:

FIG. 1 is a diagrammatic illustration of the magnetic field surrounding a magnetic dipole, along with arrows showing the direction of the field at points around the dipole;

FIGS. 2a–c are diagrammatic illustrations of the passage of a magnetic dipole past a pair of perpendicular magnetic field sensors right to the invention;

FIGS. 3a–c are waveforms taken from the output of the coils shown in FIGS. 2a–c, with the left end of the moving object being designated as the magnetic north pole;

FIGS. 4a–c are waveforms resulting from the sensing coils shown in FIGS. 2a–c with the left end of the moving object being designated as the magnetic north pole;

FIG. 6 is a block diagram of the preferred embodiment of the processing system of the invention.

Figure 1:
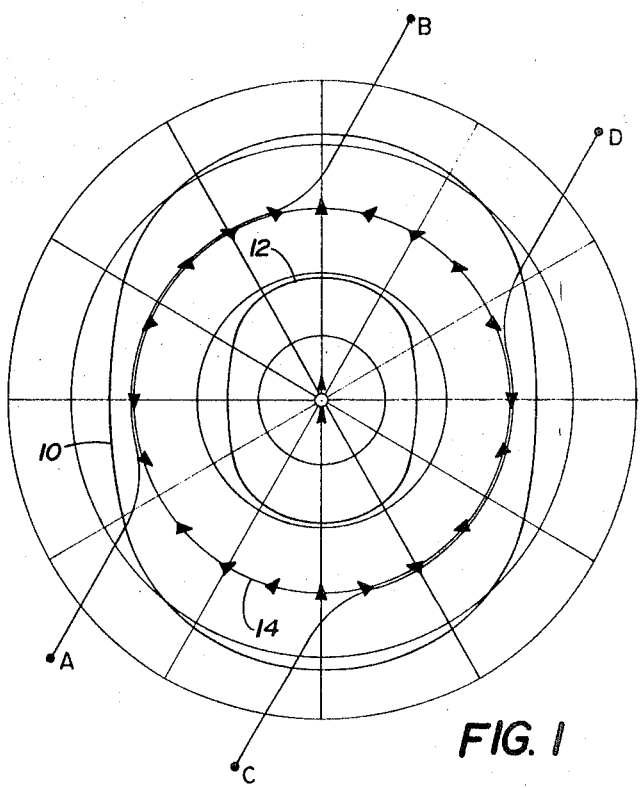

Referring to FIG. 1, the magnetic field surrounding a magnetic dipole, such as created by a ferrous object, is illustrated. Field line 10 is the H-gamma contour line, while line 12 is the 10H-gamma contour line. A plurality of vector arrows are disposed along circle 14 to illustrate the field direction at various points. It will be noticed that, with respect to an individual positioned at the center of the field, a path leading from left to right of the individual will result in movement of the associated vectors in a clockwise motion.

Hence, in moving from A to B along the path A–B, the various vectors involved may be seen to move sequentially clockwise. When the individual then faces the path C–D and an object moves left to right from point D to point C, the various field vectors move sequentially in a clockwise motion. Conversely, if the object moves from right to left of the individual at the dipole, the field vectors rotate sequentially counterclockwise. This phenomenon likewise occurs with respect to a fixed sensing station as a magnetic moment moves thereby without changing its direction of orientation.

Figure 2A:
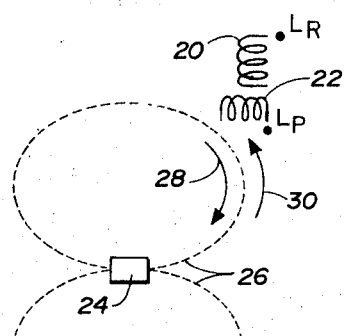
Figure 2B:
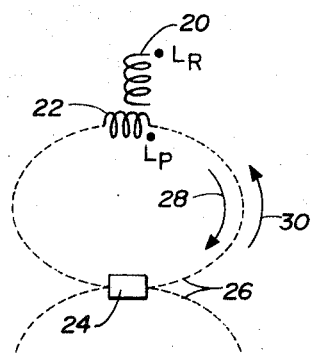
Figure 2C:
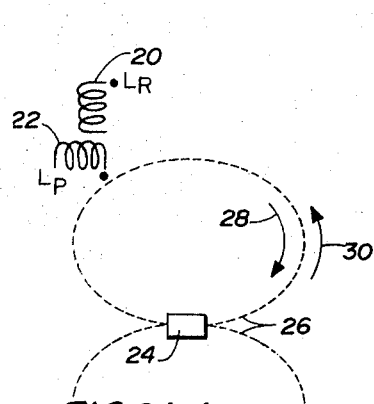

Referring to FIGS. 2a–c, a sensing coil 20 is disposed at right angles to a sensing coil 22. An object 24 has a magnetic field as illustrated by the dotted lines 26. The present invention is directed to sensing variations in a magnetic field caused by the movement of the object 24. The present system thus detects any object or body that is provided with a magnetic moment, such as a magnetic dipole or a higher order field such as a magnetic quadrupole and the like. Such objects will comprise paramagnetic and ferromagnetic bodies which pass through the earth's magnetic field and thus create magnetic field variations which are sensed by the present system. Additionally, the bodies sensed by the present system may comprise loops having current flowing therein to generate a magnetic field. Alternatively, the system may sense a permanent or induced magnet as it travels thereby. The invention may thus be used to detect weapons carried by passengers as they board aircraft, and the invention may also be utilized to detect the passage of vehicles and the like.

Referring again to FIG. 2a, when the magnetic north pole of the object 24 is at the right end as illustrated, the field line 28 is thus provided. If the left end of the object 24 is designated as the north magnetic pole, the magnetic field line 30 exists in the opposite direction. One end of each of the coils 20 and 22 is used as a reference polarity point, or a normal positive polarity point of the field created by current in the coil, as indicated by the dots on the coils. The coil 20 is positioned at a right angle to the path of movement of the object 24, while the coil 22 is positioned parallel to the direction of movement of the object 24. As shown in FIG. 2a, the object 24 is positioned at the left of the coils 20 and 22. At position 2b, the object 24 has moved even with the coils 20 and 22, while in FIG. 2c, the object 24 has moved to the right of the coils 20 and 22.

As the object 24 moves from left to right past the coils 20 and 22, each of the coils detects a magnetic field varying in time. A representation of the sensed varying magnetic fields with respect to time is illustrated in FIG. 3. Referring to FIG. 3, when the right end of the object 24 is the north magnetic pole, the waveform 3a, is generated by the coil 20 as the object 24 moves past the stations 2a–c, When object 24 is at the position shown in FIG. 2a, the field line 28 opposes the reference positive field in the coil 20 and thus a negative field, when compared to normal or zero, is output from the coil as indicated by the negative peak 32. When the object 24 is at the position shown in FIG. 2b, the coil 20 is even with the center of object 24 and thus senses a zero effect from the magnetic field of the object 24. This zero effect is indicated in FIG. 3a by the portion 34 of the output waveform from the coil 20. When the object 24 is positioned at the position shown in FIG. 2c, the field line 28 tends to aid the internal field set up in coil 20, and thus a positive output peak 36 is generated by the coil.

Referring now to FIG. 3b, when the object 24 is at the position shown in FIG. 2a, the field line 28 tends to aid the positive reference field within the coil 22, and thus a positive output results from the coil 22. Additionally, when the object 24 is at the positions shown in FIGS. 2b–c, the field line 28 also tends to aid the internal field set up within coil 22 and thus a smoothly varying positive waveform 38 is generated from the coil 22. The waveform 38 is at its peak as the object 24 passes closest to the coil 22, as shown in FIG. 2b.

Assuming that the object 24 moves from right to left past the coils 20 and 22, the object would then occupy the positions shown in FIGS. 1a–c in reverse order. Thus, the waveform identified generally by numeral 40 (FIG. 3a) will result as the output supplied by coil 20 during this right to left movement of the object 24. It will be noted that waveform 40 is an identical mirror image of the waveform formed by wave peaks 32, 34 and 36 previously discussed. Likewise, as object 24 moves from right to left past coil 22, the output wave 42 will be generated for the reasons previously discussed.

The crux of the invention is to observe the angular motion of the magnetic field vectors sensed by the present system and caused as a result of the passage of an object. Thus, the fields created in coils 20 and 22 for each of the positions shown in FIGS. 2a–c are added vectorally as illustrated in FIG. 3c. For instance, the vector 44 is representative of the vector addition of the two coil outputs when the object is at the position shown in FIG. 2a. Likewise, vector 46 is a result of the vector addition of the outputs of the coils when the object is in the position of FIG. 2b, while vector 48 is the result of the vector addition of the outputs of the coils when the object 24 is at the position shown in FIG. 2c. It will be noted that as the object 24 moves from left to right, the vectors 24–46 and 48 sequentially rotate clockwise.

Likewise, the vector 50 is the result of the vector addition of the outputs of the coils when the object 24 is in the position shown in FIG. 2c. Vector 52 is the result of the vector addition of the outputs of the coils when the object 24 is at the position shown in FIG. 2b, while vector 54 is the result of the vector addition of the outputs of the coils when the object 24 is at the position shown in FIG. 2a. It will be noted that the vectors 50, 52 and 54 sequentially rotate in a counterclockwise direction as the object 24 moves from left to right past the two mutually angled coils 20 and 22.

The phenomenon of the change of direction of the resultant vectors of the outputs of two perpendicular sensing coils in dependence upon the direction of movement of an object forms the basis of this invention. As will be subsequently described, circuitry is provided to sense the direction of the resultant vectors from the sensing coils 22 and 20 in order to indicate the directional movement, or relative position, of the object with respect to the sensing coils.

FIGS. 4a–c illustrate that the present system is not dependent upon a particular orientation of the magnetic poles of the object 24. FIGS. 4a–c are obtained in the same manner as that previously described, but with the magnetic pole of the object 24 being placed at the left end thereof. Thus, the magnetic field direction 30 is present. When the object 24 is placed in the position shown in FIG. 2a, the magnetic field 30 tends to aid the internal magnetic field within the coil 20 and thus a positive peak 56 results at the output thereof. When the object 24 is at the position shown in FIG. 2b, the magnetic field 30 has no result on the internal field within the coil 20, and thus an essentially zero wave portion 58 results at the output thereof. When the object 24 is at the position shown in FIG. 2c, the magnetic field 30 tends to oppose the internal field set up within the coil 20, and thus a negative peak 60 exists at the output of the coil 20. Movement of the object 24 from right to left of the coil 20 results in the waveform shown generally by the numeral 62 and is a mirror image of the waveform comprising the peaks 56, 58 and 60.

When the object 24 is at the position shown in FIG. 2a with respect to coil 22, field line 30 tends to oppose the internal field set up within the coil 22, and thus a negative output with respect to normal appears at the output of coil 22. Additionally, when the object 24 passes through the positions shown in FIGS. 2b–c, a negative output appears from the coil 22. Thus, a negative-going waveform 64 appears at the output of coil 22, with the most negative portion appearing when the object 24 is closest thereto as shown in FIG. 2b. As the object 24 moves from right to left past the coil 22, a mirror image of the waveform 64 appears as waveform 66.

When the output from the coils 20 and 22 are vectorally added as shown in FIG. 4c, will be noted that the resulting vectors 68, 70 and 72 rotate clockwise when the object is moving from left to right. Additionally, the resulting vectors 74, 76 and 78 may be seen to move counterclockwise as the object moves from right to left. It may thus be seen that the orientation of the magnetic pole of the object makes no difference in the use of the invention.

It may also be similarly shown that changing of the relative polarities of the coils 20 and 22 does not effect the outcome of the invention. The vectoral relationship illustrated in FIGS. 2–4 may be seen to exist when the pickup coils of the invention are placed at any angle to the path of movement of the object 24. However, for best sensitivity, it is desirable that the plane through the coil centers be crudely oriented with the line of movement of the object, as within about ±45°.

Coils 20 and 22 are preferably disposed at 90° with respect to one another in order to detect orthogonal components of the varying magnetic field. While in some instances it may be desirable to change the angle between coils 20 and 22, it has been found that simplicity of operation results when the sensing axes of the coils are disposed perpendicular to one another.

By detecting the movement of the vectors in the manner illustrated, the present invention may thus be utilized to determine the direction of movement of an object whose general position is known. Conversely, if the direction of the movement of the object is known, its location relative to the sensing coils may be determined by sensing the direction of the vector rotation. For example, if a monitoring test system is set up near an airline ticket booth, with the sensors located about waist high to the passengers, an object creating a magnetic moment carried near the sensing device may be detected as being above or below the sensor for a given observed direction of movement of the person carrying the object. This aspect of the invention is thus useful for detecting hidden weapons and the like.

Figure 5:
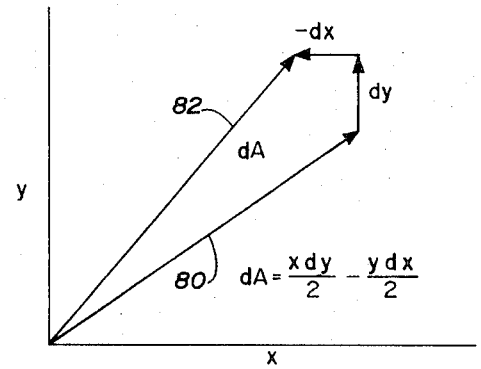
FIG. 5 is a vector diagram illustrating the detection of a moving vector in accordance with the present invention.

FIG. 5 illustrates the basic principle by which the present invention determines the direction of movement of vectors. Assume that a vector 80 has the coordinates $x+iy$ and changes by a small amount $dx+idy$ to the vector position 82. It may be shown that the area A swept out by the vector in making the change is equal to $\frac{1}{2}(xdy-ydx)$.

The sign of area $dA$ is positive if the motion of the vector is counterclockwise and negative if the motion of the vector is clockwise. The present invention envisions computing area $dA$ by developing $dx/dt$ and $dy/dt$, performing multiplication and subtraction to provide $2dA/dt=xdy/dt-ydx/dt$, and then integrating with respect to time to provide an accurate indication of area $dA$. The sign of the resulting signal will indicate direction, and the magnitude of the signal will be proportional to the object's speed and magnetic moment. Circuitry is provided such that if a positive threshold is exceeded by the signal, movement of the object from left to right will be indicated, while the exceeding of a negative threshold will indicate motion of the object from right to left.

FIG. 6 is a block diagram of the preferred embodiment of the invention for determining the direction of rotation of vectors. A pair of sensing coils 100 and 102 are disposed with their sensing axes perpendicular to one another for sensing varying magnetic fields in the manner previously described. In the preferred embodiment, coils 100 and 102 each comprises well known saturable core or "flux gate" magnetometer bridge circuits. The output of the coils 100 is fed through an amplifier 104 to a differentiator circuit 106. The output of the amplifier 104 is also fed back through an integrating amplifier 108 and a resistor 110 to the input of the amplifier 104. This feedback loop tends to remove the effects of the earth's steady state magnetic field, such that only variations in the sensed magnetic field are fed to the differentiator circuit 106. The output of the differentiator circuit 106 is fed through a pulse width modulator 112, the output of which controls the operation of multiplier gate 114. The output of the amplifier 104 is also fed via lead 116 to the input of a multiplier gate circuit 118.

The electrical signal output from the coils 102 are fed through an amplifier 120 to a differentiator circuit 122. Feedback is provided around the amplifier 120 by way of an integrating amplifier 124 and a resistance 126 in order to remove the effects of the earth's steady state field. The output of the differentiator circuit 122 is fed through a pulse width modulator 128, the output of which controls the gating operations of the multiplier gate 118. The output of the amplifier 120 is also fed via lead 130 to the input of the multiplier gate 114. The output of the multiplier gate 114 is fed to the positive input terminal of a differential amplifier 132, while the output of the multiplier gate 118 is fed to the negative input terminal thereof. The resulting output is fed to logic or computing circuitry 134 for detection of the polarity and magnitude of the resulting signal.

It will thus be seen that the circuit shown in FIG. 6 multiplies the differentiated output of each coil by the direct output of the other coil; and subtracts the multiplication products from one another to generate an output signal having a polarity dependent upon the direction of movement of the signal vectors and having a magnitude dependent upon the magnetic moment of the varying magnetic field. The present invention thus accomplishes detection of the movement and magnitude of a varying magnetic field at a single sensing station with great accuracy.

Figure 7:
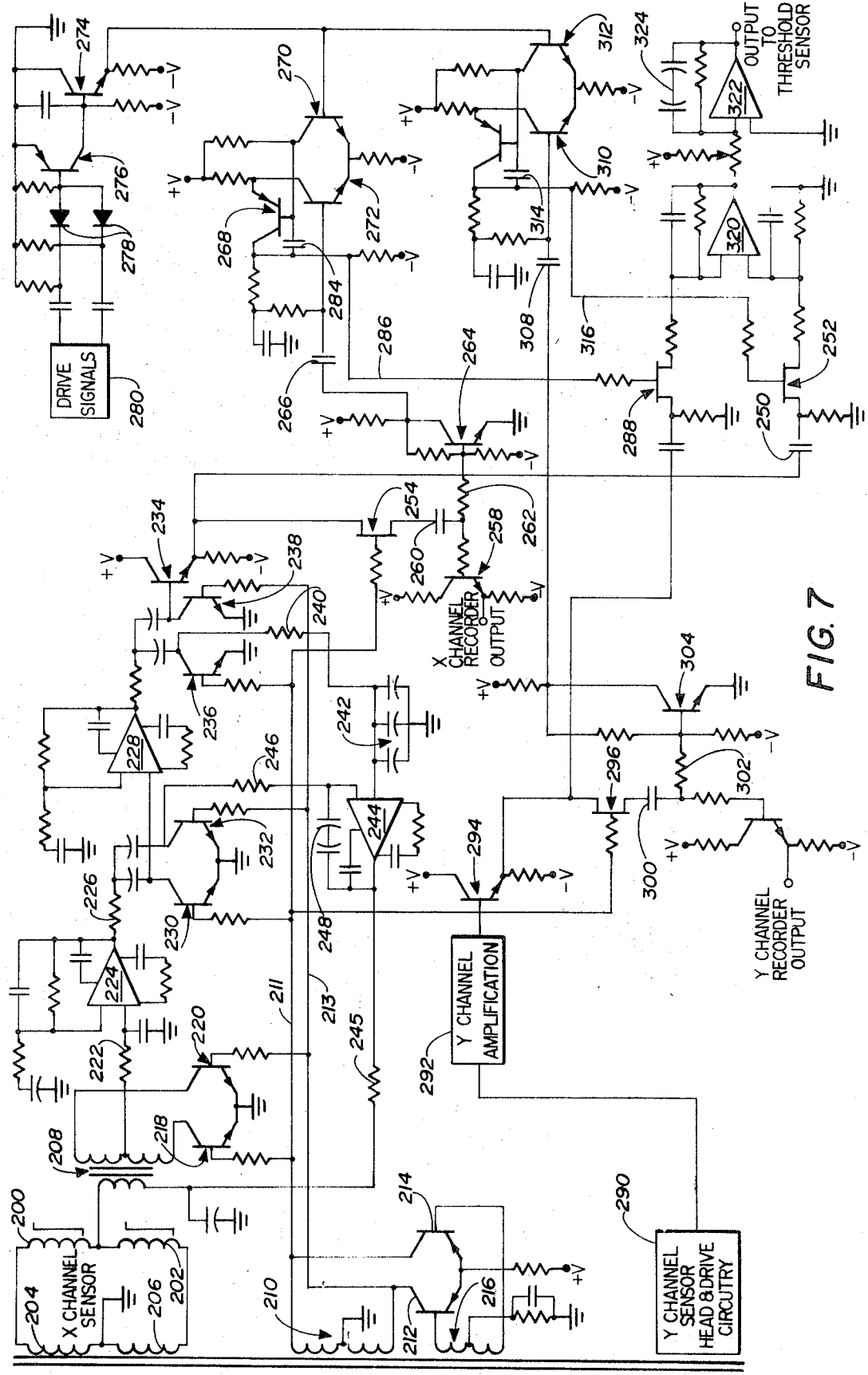
FIG. 7 is a detailed schematic diagram of the block diagram shown in FIG. 6.

FIG. 7 illustrates in schematic detail a circuit constructed in accordance with the block diagram of FIG. 6. A first magnetic field sensor includes coils 200 and 202 which comprise saturable core magnetometers. These coils are DC responsive, and therefore a high rate of speed of an object having a magnetic field is not required in order to allow detection thereof by the present circuit. Driver secondary coils 204 and 206 are connected to drive the coils 200 and 202 in the well known manner. The output from coils 200 and 202 are representative of the variances in the sensed magnetic field and are fed through a transformer 208. A driver primary winding 210 is driven by the collectors of oscillating transistors 212 and 214. The emitters of transistors 212 and 214 are connected to a source of positive voltage. The center-tapped coil 216 is connected across the bases of the transistors 212 and 214 to complete the oscillator circuitry.

The output of this oscillator results in the drive frequency which controls the operation of the system. The outputs from the driver primary 210 are applied through leads 211 and 213 to the bases of transistors 218 and 220, the collectors of which are connected across the secondary of the transformer 208. The output from the secondary transformer 208 is center-tapped and applied through resistor 222 to the input of amplifier 224. The operation of transistors 218 and 220 in accordance with the drive frequency causes the double frequency signal from the magnetometer to be mixed with the drive frequency. The resulting difference signal at the drive frequency is applied to amplifier 224. The amplified square wave signal from the output of the amplifier 224 is applied through a resistor 226 and via a synchronous filter to the input of an operational amplifier 228.

Transistors 230 and 232 are connected at the base thereof to the driver primary coil 210 for switched operation at the drive frequency. This switched operation tends to average the square wave signal to give a clean output square wave having a positive or negative amplitude proportional to the output signals from the coils 200 and 202. The output from amplifier 228 is fed via a synchronous filter to the base of a transistor 234 connected in an emitter follower configuration.

Transistors 236 and 238 are connected at the bases thereof to the driver primary coil 210 for operation at the switching frequency. The output applied to the base of the transistor 234 includes both DC and AC components, as the transistor 238 grounds the output of the signal during one-half the period of the driving frequency. The collector of the transistor 236 is connected through a resistance 240 and across capacitor 242 to the input of an operational amplifier 244. The input applied to amplifier 244 is primarily a DC term which is fed back through the amplifier 244 in order to counteract the steady state response of the coils 200 and 202 to the earth's magnetic field. The collector of transistor 232 is connected through a resistor 246 to the second input of the amplifier 244. The capacitors 248 are connected across the amplifier 244 to provide an integrating function thereto. The output of the integrating amplifier 244 is fed through resistor 245 to the primary of the transformer 208.

The signal appearing at the emitter of the transistor 234 is fed through a capacitor 250 so that an essentially AC signal is applied to a field effect transistor 252. Transistor 252 is gated by a pulse width modulated signal from the Y channel in the manner to be subsequently described. The output from the emitter follower transistor 234 is also applied through a field effect transistor 254 which is gated on by the drive signal from coil 210. The output from the transistor 254 is applied through a transistor 258, such that the demodulated signal appearing at the emitter of transistor 258 may be connected to a X-Y plotter for recording.

The output of transistor 254 is fed through a capacitor 260 and a resistor 262 which comprise a differentiator circuit. As the field effect transistor 254 is only turned on during one-half cycle when the input voltage thereto is nonzero, the square wave is not differentiated, but only the outer envelope of the square wave is differentiated, and only during the half-cycle when the input voltage is nonzero. This differentiated signal is fed to the base of a transistor 264, the collector of which is fed through a capacitor 266 for elimination of any DC components thereon.

The signal is applied from capacitor 266 to a pulse width modulator circuit comprising a transistor 268 having the base thereof connected to the collector of the transistor 270. The emitter of transistor 268 is connected to the collector of a transistor 272. The emitters of transistors 270 and 272 are commonly connected and are applied to a source of negative bias voltage. The base of transistor 270 is directly connected to the emitter of the transistor 274. The base of transistor 274 is connected to the collector of a transistor 276, the base of which is connected through diodes 278 and associated circuitry to a source of drive signals 280, which may comprise the drive signals from coil 210. Transistors 274 and 276 and the associated circuitry comprise a sawtooth wave generator operated at twice the drive frequency. The resulting sawtooth wave is applied to the base of a transistor 270. The pulse width modulator comprises a voltage comparator which utilizes the sawtooth waveform as a reference voltage for comparison with the input signal fed through the capacitor 266 to the base of the transistor 272.

As the sawtooth waveform has twice the drive frequency, the time of comparison of the input and reference voltages varies in accordance with the level and polarity of the input signals. In the discussion of the operation of the modulator, the drive signal appearing on lead 211 will be designated as having the reference phase, and the time that the drive signal is positive will be termed the "A" half-cycle and when the drive signal is negative will be termed the "B" half-cycle. The output of the modulator will comprise a pulse during the A half-cycle and a pulse during the B half-cycle. In the absence of an input signal, the output pulses from the modulator will have equal width and will form a generally symmetrical square wave. When a square wave is input into the modulator, one of the output pulses will be shortened and one of the output pulses will be lengthened. If the input square wave is positive during the A half-cycle, the output pulse occurring during the A half-cycle will be shortened while the output pulse occurring during the B half-cycle will be lengthened. Therefore, the output of the pulse width modulator circuit is fed from the collector of transistor 270 through a capacitor 284, and via a lead 286 to gate the operation of a field effect transistor 288.

A Y-channel sensor head and driver circuitry 290 is identical to the X-channel sensor and driving circuitry previously described, with the exception that the coils of the Y-channel sensing head are perpendicularly disposed with respect to the coils 200 and 202. The output from the Y-channel sensor head is fed through a Y-channel amplification system 292 which again is identical to that previously described, including the feedback loop for elimination of response to the earth's steady state magnetic field. The amplified square wave output from the Y-channel is fed through the emitter follower connected transistor 294 and to a field effect transistor 296 which is gated by a gate signal 298. The output from the gated transistor 296 is fed through a differentiation circuit comprising capacitor 300 and resistor 302, and is then applied to the base of a transistor 304. The output is also fed to the base of a transistor 306 for application to the X–Y plotter for recording, if desired.

The collector of the transistor 304 is coupled through a capacitor 308 for removal of any DC components thereon. The resulting square wave input is fed to a pulse width modulator circuit similar to that previously described and which includes transistors 310 and 312. The base of transistor 312 is connected to the sawtooth wave generator. The resulting voltage comparison results in a pulse-width-modulated signal which is fed from the collector of transistor 312, through a capacitor 314 and then routed through lead 314 to gate the field effect transistor 252.

It may thus be seen that the present circuit gates the square wave output from the coils 200 and 202 at the field effect transistor 252 by use of the differentiated and pulse-width-modulated signal from the Y-channel sensor 290. Similarly, the output square wave from the Y-channel sensor 290 is gated at the field effect transistor 288 by the differentiated and pulse-width-modulated signal from the X-channel sensor coils 200 and 202.

The pulse-width-modulated signals applied to gate transistors 252 and 288 control the portions of the input signal which is passed thereby. If the input signal applied to the gates is zero, the gated output is zero, regardless of the pulse widths of the modulated gating signals. Assuming an input to the gate transistor, if the pulse widths of the modulated gating signals are equal, then the gate output will be a train of equal width and amplitude positive and negative pulses. This thus gives zero net effect to the following integrator output. If during the A half-cycle the input signals to the gate transistors are positive, and a lengthened modulated pulse is present as a gate signal, then the gate transistor will output a positive pulse greater in area than the negative pulse in the following B half-cycle. The difference in area of the two pulses is proportional to the product of the input signal amplitude and the difference in A- and B-cycle pulse lengths. This will provide a net effect in the following integration. If during the A half-cycle the input signals to the gate transistors are negative, and a lengthened modulated pulse is present as a gate signal, then the gate transistor will output a negative pulse greater in area than the following positive pulse. The operation of the gating circuits for additional cases of input and gate signals will be readily understood.

The multiplied output signals from the field effect transistor 252 are fed to one input of a differential amplifier 320, while the multiplied signals from the field effect transistor 288 are applied to the other input thereof. The resulting output signal from the amplifier 320 is dependent upon the difference between the two multiplied signals, and is of a magnitude large enough to drive the amplifier 322 which includes a large capacitance 324 connected thereacross. The output of the amplifier 322 is applied to a threshold sensor wherein the polarity of the signal may be determined by common logic circuitry.

If the resulting output signal is positive, the object creating the variances in the sensed magnetic field is known to be traveling in one known angular direction as observed from the sensor. If the output from the amplifier 322 is negative, the object is known to be moving in the opposite direction. If the output from the amplifier 322 is zero, no movement is present. The magnitude of the output signal from the amplifier 322 is indicative of the magnitude of the magnetic moment of the object to thereby assist in the classification of the object.

While the present application has been described with respect to the use of saturable core magnetometers, if will be understood that inductive coils and suitable low level sensing amplifiers could be utilized therefore. Additionally, conventional solid-state integrated circuit multipliers could be utilized in place of the field effect transistor gating technique described with respect to FIG. 7.

It will be understood that the present invention will be utilized to operate various alarms or lights if the presence of an object moving in a particular direction or having a particular magnetic moment is sensed thereby. Such alarms or indicators may thus be used for traffic control or for security purposes.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A system for detection of varying magnetic fields at one location, said varying magnetic fields being caused either by movement of an object through a fixed external field, or by movement of an object carrying a source of magnetic fields relative to said one location, said system comprising:
   a plurality of magnetic field sensors each generating output signals representative of a different directional component at said one location of a magnetic field,
   means responsive to the output signals from said sensors for generating time derivative signals, and
   means for combining said output signals with said time derivative signals to produce resultant signals representative of the direction, speed and magnetic moment of said object causing the varying magnetic field.

2. The system of claim 1 wherein the sign of said resultant signals is dependent upon the direction of movement of the object causing the varying magnetic field.

3. The system of claim 1 wherein said field sensors generate output signals representative of perpendicular magnetic field components.

4. The system of claim 1 wherein said magnetic field sensors comprise magnetometers including means for removing steady state magnetic field components from the output thereof.

5. The system of claim 1, wherein said means for combining comprises circuitry for multiplying each said output signal by the time derivative of the other output signal.

6. The system of claim 5 and further comprising:
   means for subtracting one multiplication product from the other product to generate a signal having a polarity dependent upon the direction of movement of the object.

7. A system for detection of varying magnetic fields at one location comprising:

means for generating a pair of output signals representative of two directional components of a varying magnetic field at said one location, means for differentiating each of said output signals, means for generating multiplication products by multiplying each said output signal by the differential of the other output signal, means for subtracting one multiplication product from the other multiplication product, and means for sensing the polarity and magnitude of the remainder of the subtraction operation.

8. The system defined in claim 7 wherein said means for generating a pair of output signals comprises a pair of coils responsive to orthogonal magnetic field components.

9. The system defined in claim 7 wherein said means for generating a pair of output signals comprises a magnetometer having coils disposed perpendicular to one another.

10. The system defined in claim 7 wherein said means for multiplying comprises a gate controlled by said means for differentiating.

11. The system defined in claim 7 wherein the varying magnetic field results from an object moving relative to said one location, said object either carrying a source of magnetic fields or passing through a fixed external field, and the polarity of said remainder of the subtraction operation is dependent upon the direction of travel of said object causing the varying magnetic field.

12. A method for detecting a varying magnetic field at one location comprising:

generating output signals representative of two directional components of a varying magnetic field at said one location, differentiating each of said output signals, generating a pair of multiplication products by multiplying each said output signal by the differential of the other output signal, subtracting said multiplication products from one another, and detecting the polarity and magnitude of the remainder of the subtraction.

13. The method of claim 12 wherein said two directional components are perpendicular.

14. The method of claim 12 wherein the varying magnetic field results from an object moving relative to said one location, said object either carrying a source of magnetic fields or passing through a fixed external field, and the polarity of the remainder of the subtraction is dependent upon the direction of travel of said object causing the varying magnetic field.

15. The method of claim 12 and further comprising:

eliminating from said output signals steady state portions resulting from the earth's magnetic field.

* * * * *